United States Patent [19]

van der Lely

[11] Patent Number: 4,541,491

[45] Date of Patent: Sep. 17, 1985

[54] PLOW

[76] Inventor: Cornelis van der Lely, 7 Brüschenrain, Zug, Switzerland

[21] Appl. No.: 184,176

[22] Filed: Sep. 4, 1980

[30] Foreign Application Priority Data

Sep. 7, 1979 [NL] Netherlands .......................... 7906694

[51] Int. Cl.⁴ ...................... A01B 15/08; A01B 17/00
[52] U.S. Cl. ......................................... 172/33; 172/19; 172/167; 172/716
[58] Field of Search .................. 172/33, 1, 19, 47, 20, 172/66, 125, 67, 167, 716-718, 59, 68; 171/129; 198/403, 404, 658; 271/186, 65; 226/196, 200; 37/DIG. 7; 241/178

[56] References Cited

U.S. PATENT DOCUMENTS

| | | | |
|---|---|---|---|
| 41,371 | 1/1864 | Foley | 172/20 |
| 372,557 | 11/1887 | Morley | 172/33 |
| 1,209,848 | 12/1916 | Kernan | 172/33 X |
| 1,419,743 | 6/1922 | Lohberger | 172/67 X |
| 1,457,084 | 5/1923 | McLaughlin | 241/178 X |
| 1,919,705 | 7/1933 | Petersen | 172/33 |
| 1,957,290 | 5/1934 | Railing | 171/129 |
| 2,316,032 | 4/1943 | Wallace | 241/178 X |
| 2,617,347 | 11/1952 | Provost | 172/20 |
| 2,663,242 | 12/1953 | Lancaster | 172/19 |
| 2,741,173 | 4/1956 | White | 172/59 X |
| 3,247,812 | 4/1966 | Luciano et al. | 172/47 X |
| 3,490,624 | 1/1970 | Fichtl | 198/658 X |
| 3,696,535 | 10/1972 | Kallio | 198/658 X |
| 3,885,633 | 5/1975 | van der Lely et al. | 172/68 |
| 3,896,863 | 7/1975 | Smiltneek | 241/178 X |
| 3,983,943 | 10/1976 | Lely | 172/47 X |
| 4,037,544 | 7/1977 | Cantone | 172/125 X |
| 4,043,402 | 8/1977 | Nelson | 172/125 |

FOREIGN PATENT DOCUMENTS

| | | | |
|---|---|---|---|
| 1232142 | 5/1971 | United Kingdom | 172/20 |
| 578916 | 11/1977 | U.S.S.R. | 172/33 |

*Primary Examiner*—Paul E. Shapiro
*Attorney, Agent, or Firm*—Penrose Lucas Albright

[57] ABSTRACT

A plow has coupling members at its forward side for connection to a multi-point hitch of a tractor. Furrow slicing members at the front form furrow slices which are elevated to furrow turning drums during operation. The furrow slices are turned about their longitudinal axes and deposited to the rear by the rotating drums. The drums are mounted on rollers and driven to rotate about upwardly and forwardly extending axes at preselected speeds. Projections within the drums turn the furrow slices which can be inverted and deposited to the rear.

8 Claims, 9 Drawing Figures

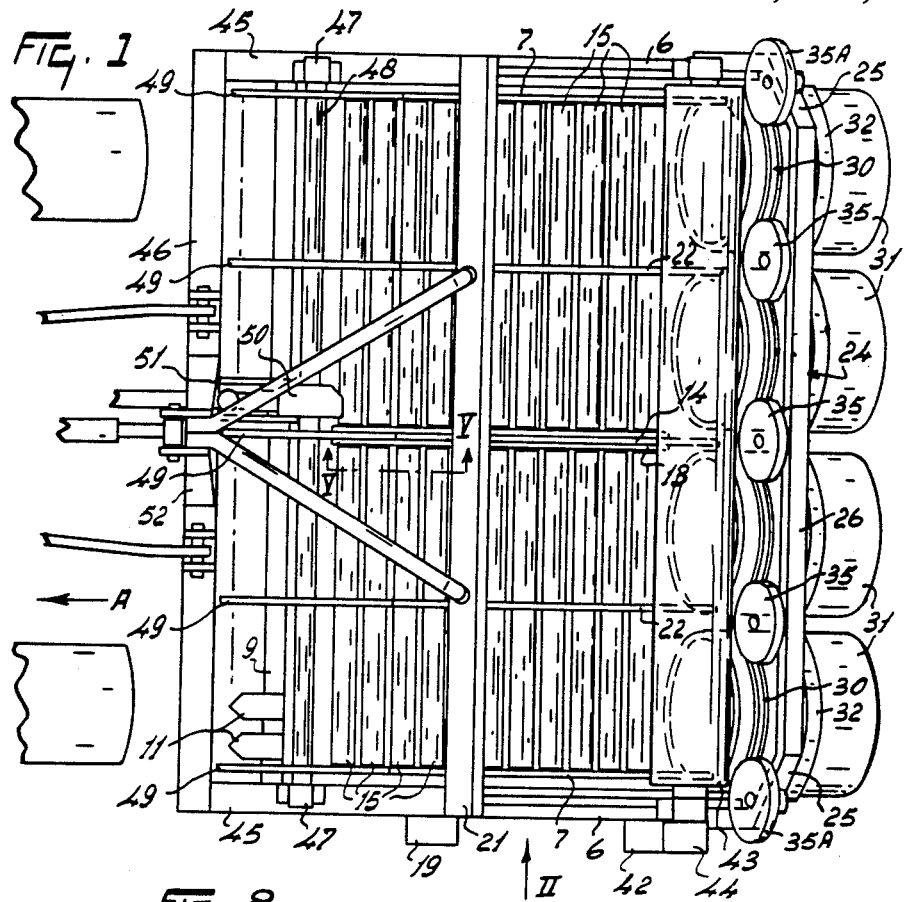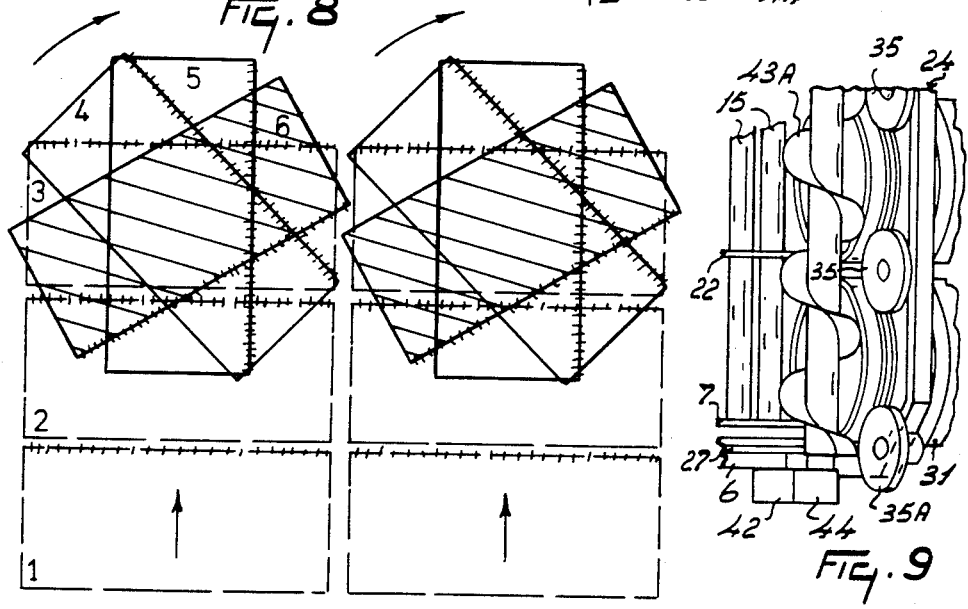

FIG. 2

PLOW

The invention relates to a plow comprising frame means.

In accordance with the invention there is provided a plow comprising frame means, power driven turning means for turning furrow slices, mainly about a longitudinal axis, said power driven turning means working adjoining strips of ground, said power driven turning means being arranged in said frame means so as to overlap each other when viewed in a direction transversely of the intended direction of operative travel of the plow, said two turning devices are at a distance to each other, which distance is less than the working width of a turning device, said power driven turning means delivering said furrow slices at their rear sides with respect to their intended direction of operative travel during normal work onto the ground.

For a better understanding of the present invention and to show how it may be carried into effect, reference will now be made, by way of example, to the accompanying drawings, in which:

FIG. 1 is a plan view of the plow;

FIG. 2 is a side view of the plow taken in the direction of the arrow II in FIG. 1;

FIG. 8 illustrates diagrammatically the manner in which the machine operates; and FIG. 9 shows an alternative construction for part of the plow.

Figure 2:
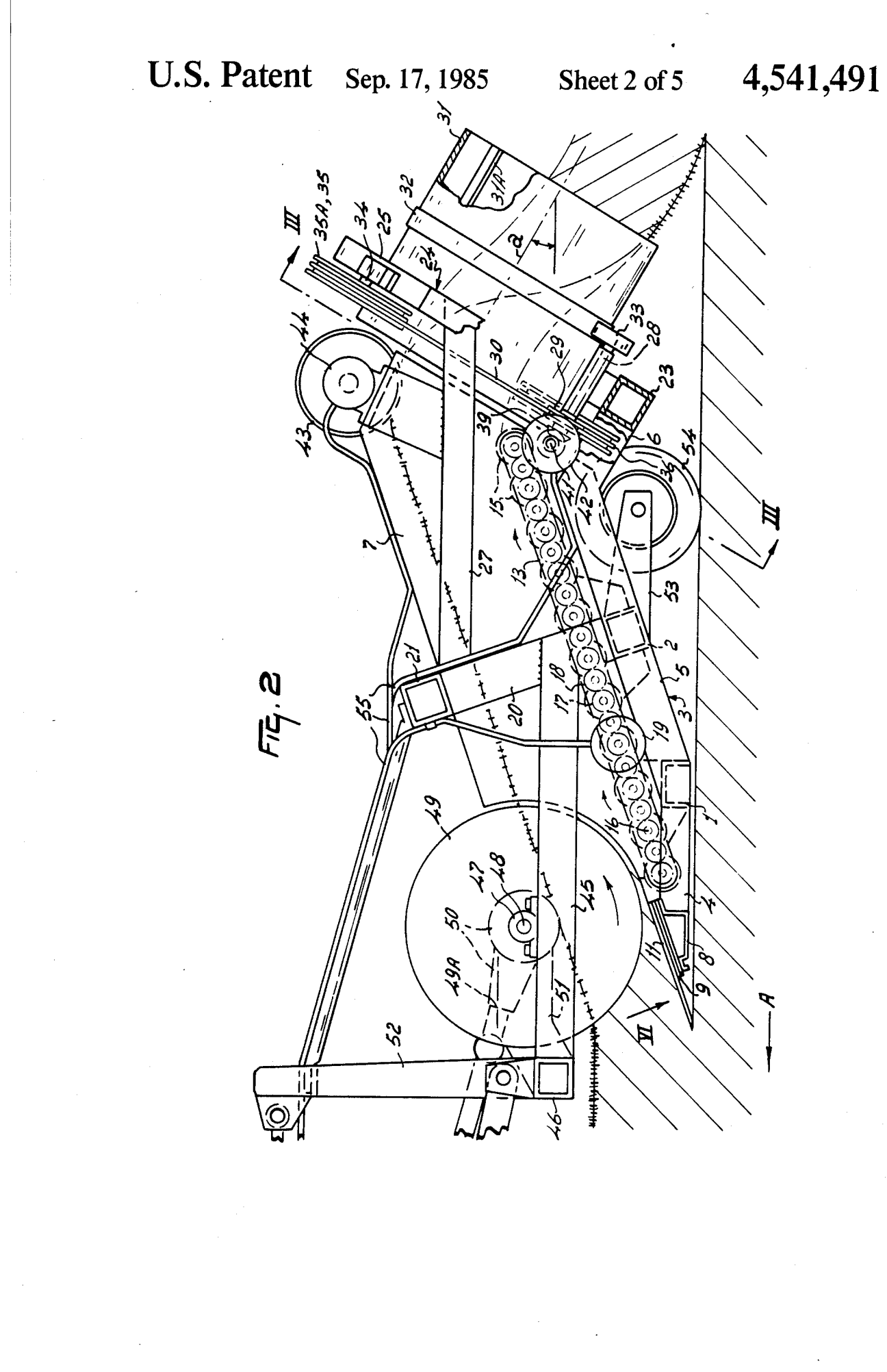
Figure 3:
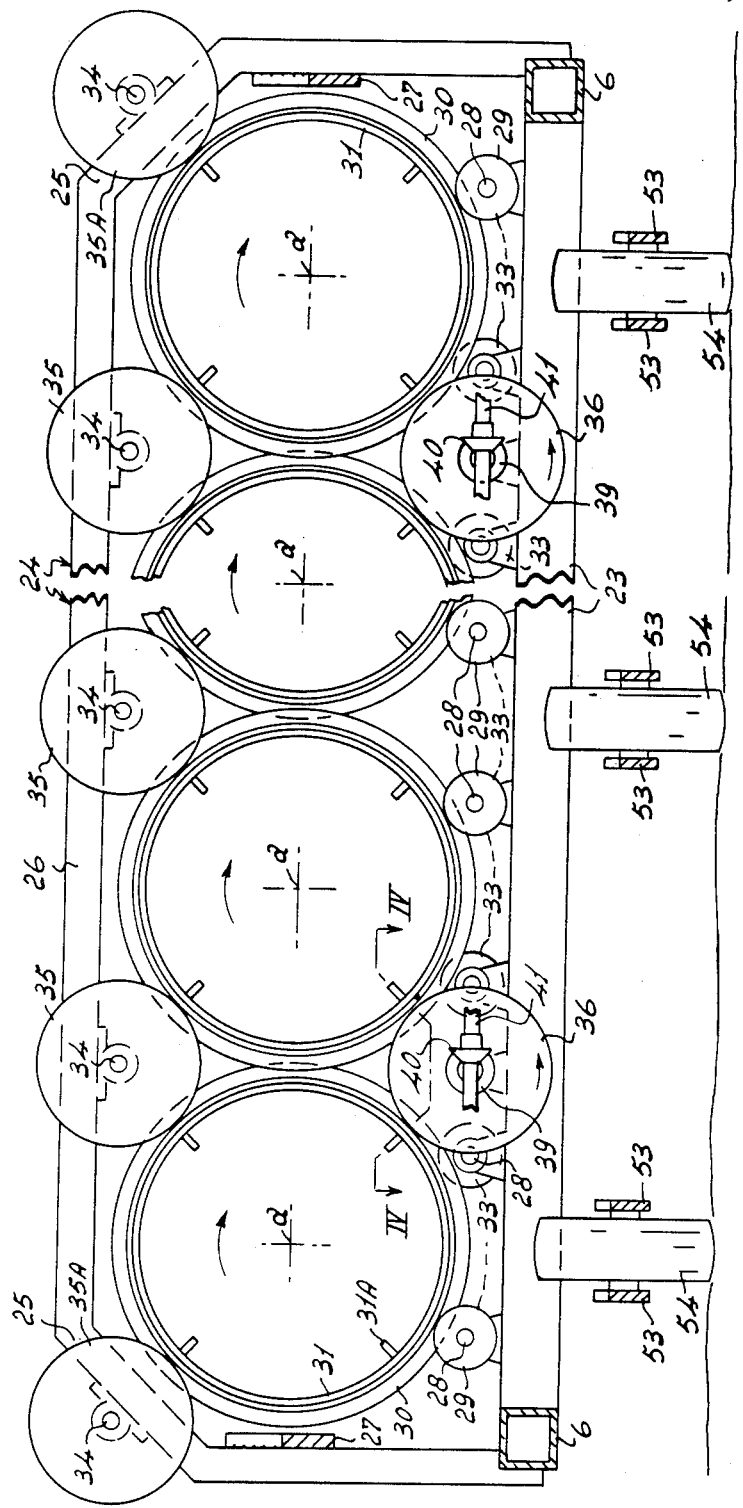
FIG. 3 is a view taken on the line III—III in FIG. 2.

The plow shown in FIGS. 1 to 7 is intended to perform the function of a plow, namely the cutting out and the turning of furrow slices. The plow comprises a frame including two lower frame beams 1 and 2, which extend transversely of the intended direction of operative travel of the machine, which is indicated by an aarrow A in the drawings. The beams 1 and 2 are located one behind the other with respect to the direction A. The rear beam 2 is at a higher level than the front beam 1. The ends of the beams 1 and 2 are interconnected by tie beams 3. Each tie beam 3 has a portion 4 which projects to the front from the beam 1.

Figure 7:
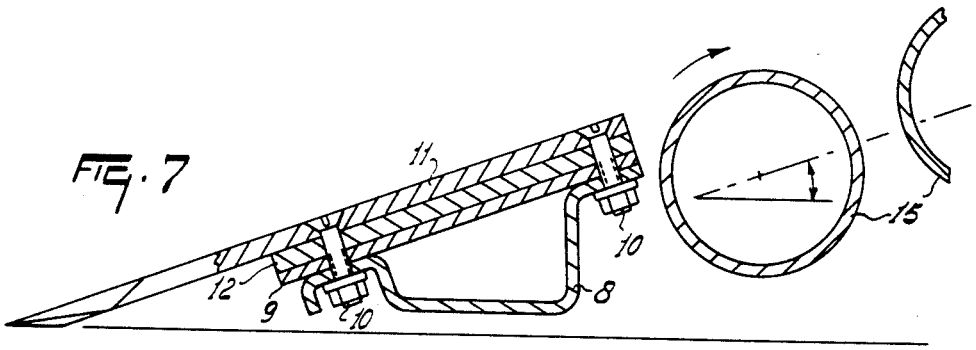
FIG. 7 is a partly sectioned view taken on the line VII—VII in FIG. 6.

As can be seen in FIG. 2, the portion 4 is substantially horizontal. The beam 3 has a further portion 5, behind the beam 1, which slopes upwardly from front to rear at an angle of about 20° to the horizontal. Near its rear end, each beam 3 has a downwardly sloping portion 6. Upwardly extending plates 7 are fastened to the tie beams 3. The rear edge of each plate 7 slopes upwardly to the rear to meet a forwardly and upwardly inclined edge towards the top of the plate, which meets an edge extending parallel to the portion 5 of the beam 3. The leading edge of each plate 7 has a circular recess for receiving a rotary knife which will be described later. The leading ends of the portions 4 of the beam 3 are interconnected by a beam 8 shaped from sheet material. The beam 8 is parallel to the beams 1 and 2 and comprises a channel-section with upwardly extending side walls of unequal lengths. The front side wall of the cross-section is slightly inclined forwardly and is shorter than the rear side wall, which is substantially, if not exactly, vertical. At the top, the side walls of the beam 8 have bent over portions, on which the beam supports a plate 9, which closes the upper, open side of the channelsection and is secured in place by bolts 10 (FIG. 7). The bolts 10 additionally secure regularly spaced flat tines 11 to the beam 8, filler plates 12 being sandwiched between the tines 11 and the plate 9. The length of the tines 11, which terminate in points at the front, is such that the points are disposed just below the underside of the beam 8 in the working position of the machine (see FIGS. 2 and 7).

Near the center of the machine there is a first gearbox 13, fastened to the upper surfaces of the two beams 1 and 2. The gearbox 13 is arranged so that its broader faces extend upwardly from just behind the beam 8 to near the rear edges of the plates 7. The top of the gearbox 13 is provided with a plate 14 (FIG. 5), which extends parallel to the plates 7 and has a shape corresponding with that of the plates 7. Rollers 15 are disposed between the gearbox 13 and each of the plates 7 lying one behind the other, such that a plane containing the rotary axes of the rollers is inclined to the horizontal by about 20° in the working position of the machine as show in FIG. 2. The rollers 15 are rotatably supported on shafts and bearings in each of the plates 7. Each pair of aligned rollers 15, one on each side of the gearbox 13, are journalled on a shaft 16 in the gearbox 13. Each shaft 16 is provided with pinions at a location within the gearbox 13. These pinions 17 mesh with intermediate pinions 18 such that during operation the rollers all rotate in the same direction as one another and serve as transport or elevating means (see FIG. 2). One of the rollers 15 near the center of the line of rollers is connected at one end with a hydraulic motor 19, mounted on the side of one of the plates 7. Supporting beams 20 are provided on the outer sides of the plates 7 and extend upwardly from the beam 2. The beams 20 are interconnected at a position above the plates 7 by a transverse beam 21. Midway between the gearbox 13 and each plate 7 there is a plate 22 which is arranged above the rollers 15 and is supported by the transverse beam 21. The plates 22 have generally the same shape as the side plates 7. The plates 7, 14, 22 and the rollers 15 provide four troughs which are inclined upwardly from front to rear by about 20° to the horizontal. In front of the troughs, there is the beam 8 with the tines 11, forming a soil lifting member. Each trough has a width of about 50 cms; the overall working width of the machine is therefore about 2 meters.

A frame beam 23 lies between the portions 6 of the beams 3, extending transversely of the direction A and parallel to the beams 1 and 2. A beam 24 has two limbs which extend upwardly from the portions 6 where they are joined by the beam 23. The limbs are interconnected by a crossmember 26 of the beam 24 (FIG. 3). The limbs of the beam 24 are substantially perpendicular to the portions 6 and are parallel to the inclined rear edges of the plates 7, 14 and 22. The limbs are connected to the cross member 26 by inwardly inclined portions 25. The cross member 26 is parallel to the beam 23. Supports 27 extend forwardly from the center of each limb of the beam 24 and are connected with the transverse beam 21. Shafts 28 are rotatably mounted in bearings provided on the top of the beam 23.

Figure 4:
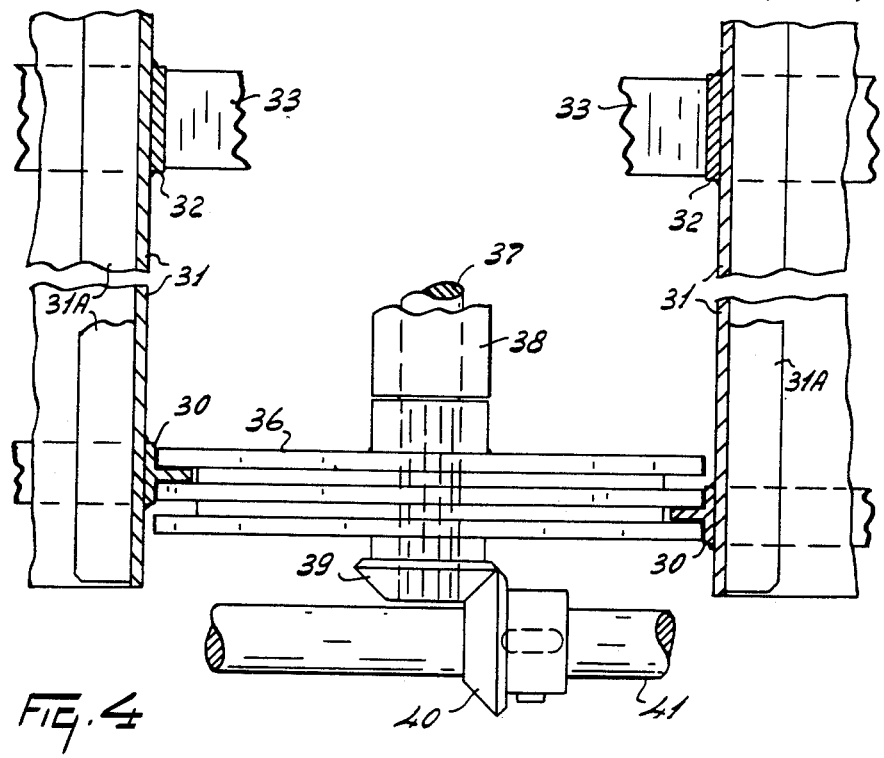
FIG. 4 is a view taken on the line IV—IV in FIG. 3.
Figure 5:
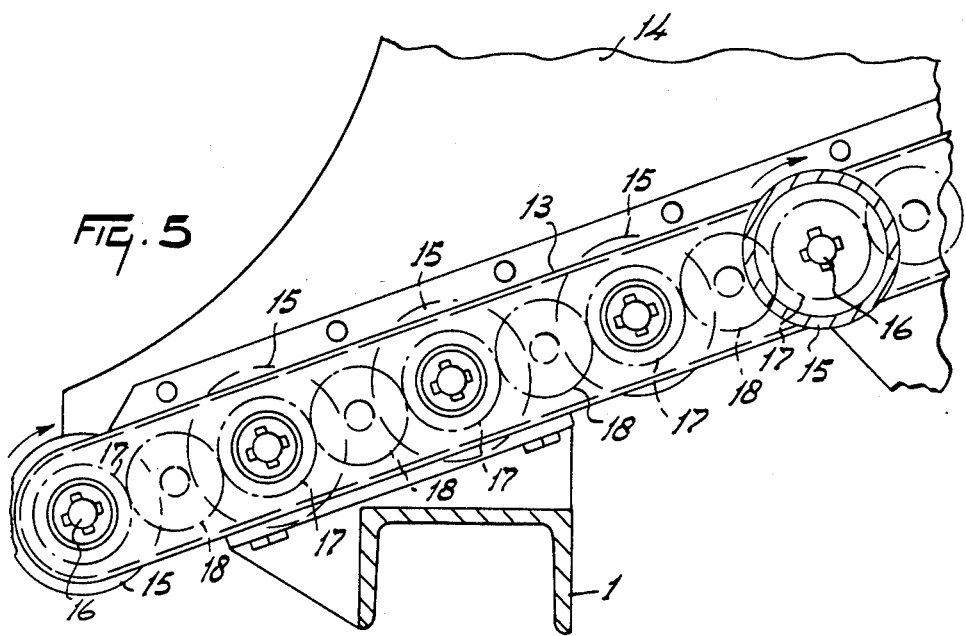
FIG. 5 is a view taken on the line V—V in FIG. 1.
Figure 6:
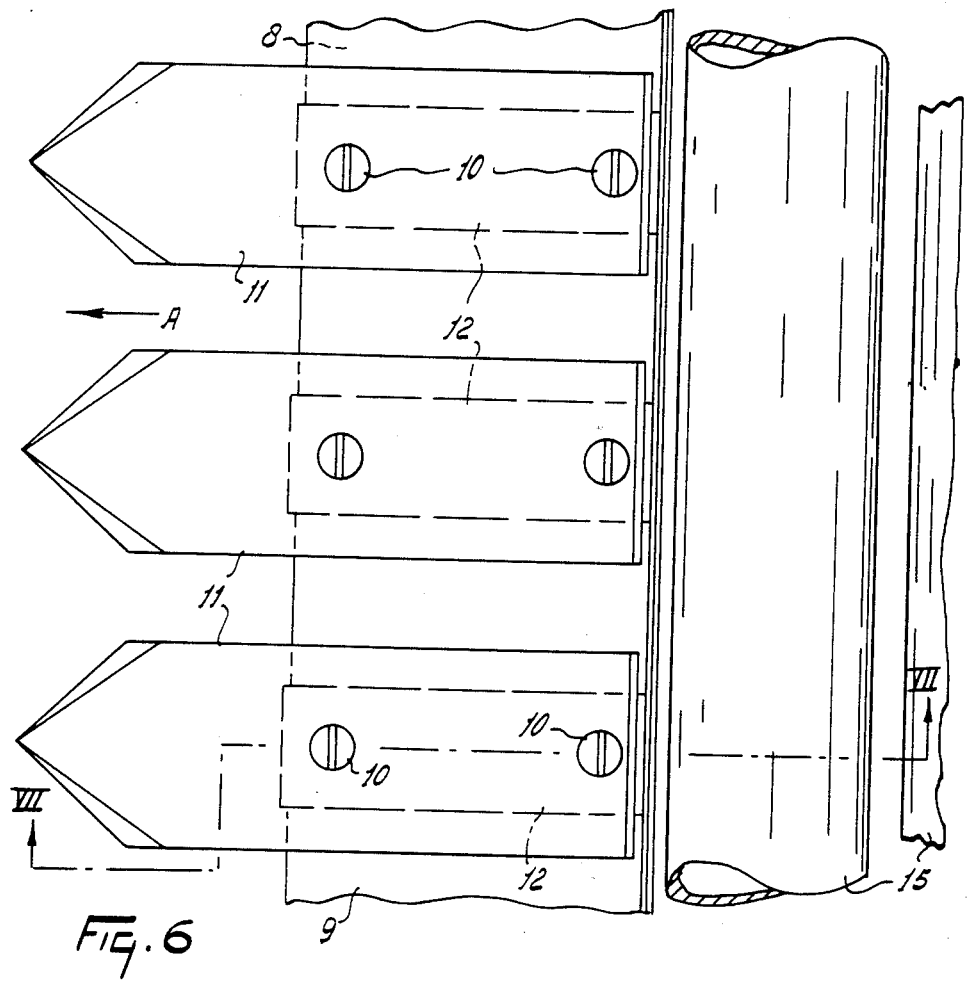
FIG. 6 is a fragmentary view taken in the direction of the arrow VI in FIG. 2.

As is clear from FIG. 3, the shafts 28 are disposed in pairs. The distance between the shafts of each pair is the same for all of the pairs, and the distance between neighbouring shafts of adjacent pairs is substantially equal to the distance between the shafts of each pair. The shafts 28 are substantially at right angles to the rear edge of the plates 7, 14 and 22, being downwardly inclined from front to rear about 30° to the horizontal. Each shaft 28 is provided at its front end which extends beyond the beam 23 (see FIG. 2) with a supporting roller 29. Each roller 29 has at its circumference a groove formed between projecting flanges. The groove cooperates with T-section rings 30 (FIG. 4) mounted at the front ends of four turning members or drums 31. The drums 31 are arranged side by side, their center lines a, as viewed on plan, being located parallel to and midway between the shafts 28 of respective pairs. Thus the front end of each drum is at a higher level than its rear end. The inner surface of each drum is continuous and is provided with projecting ribs 31A which extend the full length of the drum and are distributed at 90° intervals around the surface. The ribs 31A have edges that are mainly parallel to the wall of the drum and have a height which is smaller than one quarter of the drum diameter. Approximately midway along its length, each drum is provided with a supporting ring 32, which cooperates with supporting rollers 33 at the rear ends of the respective shafts 28. The supporting rollers 33 have bearing surfaces which are substantially parallel to the rotary axis of the drums 31. Rollers 35, 35A are freely rotatable in bearings secured to the lower surface of the cross member 26 and on the upper surface of the portions 25 of the beam 24. The rollers 35 on the cross member 26 are provided at their peripheries with two spaced grooves formed between flanges which can cooperate with the rings 30 on two adjacent drums 31. The rings 30 of adjacent drums 31 are axially off-set as shown in FIG. 3. The rollers 35A co-operate with the ring 30 of only one drum 31 and so they have only one groove. The drums 31 are arranged side by side and are driven in pairs. The diameter of each drum 31 substantially corresponds to the width of the trough, i.e. about 50 cms. The length of each drum 31 is also substantially equal to this width (see FIG. 2). The drive to each pair of drums 31 (see FIG. 3) comprises a driving roller 36 co-operating with the rings 30 of both drums of the pair. The periphery of the roller 36 is similar to that of the supporting rollers 35 arranged on the cross member 26. However, the bottoms of the grooves of the driving rollers 36 are provided with friction means. Each driving roller 36 is arranged on a respective shaft 37 which is journalled in a bearing 38 on the top of the beam 23. Each shaft 37 is parallel to the shafts 28 of the supporting rollers 29 and 33 (FIG. 4). At the front, each shaft 37 is provided with a bevel pinion 39 which meshes, inside a gearbox (not shown for the sake of clarity), with a bevel pinion 40 on a drive shaft 41, which extends the full length of the beam 23 and in parallel to it. At one end the drive shaft 41 is connected with a hydraulic motor 42. The bevel pinion transmissions 39, 40 cause the drums 31 to rotate in the same sense during operation, as indicated by arrows in FIG. 3.

A roller 43 is arranged above the forwardly inclined top edges of the plates 7, 14 and 22. The roller 43 is mounted in bearings, and is located near the tops of the drums. It is driven from one end by a hydraulic motor 44. The roller 43 has a smooth outer surface, but in an alternative construction it may be a kind of auger, as shown in FIG. 9.

In operation, the extension 43A imposes a pushing effect in a direction corresponding with the direction of rotation of the respective drums 31.

Approximately midway along the supports 20 are provided beams 45 extending forwardly along the plates 7. The beams 45 are interconnected at their front ends by a transverse beam 46. At generally the same position along the machine as the beam 8, the beams 45 are provided with bearings 47 which receive the ends of a shaft 48 extending parallel to the transverse beam 46. At positions in front of the plates 7, 14 and 22, the shaft 48 is provided with circular knives 49. The diameter of each knife 49 is substantially twice the distance between the rotary axis of the shaft 48 and the rotary axis of the leading roller 15. The rear portion of each knife 49 is received in the arcuate recess, previously mentioned, in the respective plates 7, 14 and 22. Midway along its length, the shaft 48 is drivably connected by a bevel pinion transmission with a forwardly projecting shaft 49A. The bevel pinion transmission is arranged in a gearbox 50 supported by a support 51 on the transverse beam 46. As shown in FIG. 2, the shaft 49A is slightly inclined upwardly away from the shaft 48. Midway along the beam 46 there is a trestle 52 for attachment to the three-point lifting device of a tractor. The top of the trestle 52 is connected with the transverse beam 21 by means of diverging supports.

Freely rotatable ground wheels 54 are mounted on the beam 2. For this purpose, the beam 2 is provided with pairs of equally spaced arms 53 which are slightly inclined to the rear, and between which the ground wheels 54 are supported. The ground wheels 54 may be vertically adjustable to set the working depth of the machine.

For operation, the machine is mounted on a tractor by connecting the trestle 52 to the three-point lifting device of the tractor. The shaft 49A for driving the knives 49 is connected by an auxiliary shaft to the power take-off shaft of the tractor. The hydraulic motors 19, 42 and 44 for driving the rollers 15, the drums 31 and the roller 43 are connected by conduits 55 with a hydraulic pump of the tractor. In operation, the machine occupies the position shown in FIG. 2. The machine is pulled by the tractor in the direction of the arrow A, and the share-like lifting member comprising the flat tines 11 lifts a slab of earth of a given thickness. The slab is divided into four adjacent slices by the knives 40 rotating in the direction of the arrow in FIG. 2. The furrow slices are conveyed by the elevating means constituted by the roller 15 through the troughs formed between the respective plates 7, 14 and 22 until they reach the top where, guided by the roller 43, they enter the respective drums 31. The drums 31 serve as turning devices and turn the furrow slices with the assistance of the ribs 31A, about their longitudinal axes to a greater or lesser extent without being laterally displaced. The furrow slices are deposited at the rear end of the drums. The hydraulic motor 42 can be adjusted from the tractor to vary the speed of rotation of the drums 31, which speed may be e.g. 40–100 rev./min. Depending on the nature of soil being worked on and on the prevailing conditions the angle through which each slice is turned can therefore be adjusted by the tractor driver. For example, if the soil is difficult to turn or if weeds are present, the tractor driver can increase the speed of the drums, the slices will be satisfactorily inverted. An auger type of transporting device can be used for moving the topside of the furrow slices to be laterally displaced over a given distance with its full width without turning and then twisted about its axis so that it can be deposited in its own furrow in a more or less turned position without lateral displacement. As stated above the extent of inversion of the furrow slices can be adjusted by varying the speed of rotation of the drums. The speed of the drums can, however, also be adjusted to suit to the travel speed of the machine.

In contrast to the known plows, which extend far behind the tractor if a large working width is required, the machine described above may be of a compact, i.e. short, construction with a large working width, which in this embodiment will be about 2 meters. Furrow slices which are about 50 cms wide can be turned through a controlled angle and returned to the ground without being compressed. In this manner the soil structure is not adversely affected.

The machine may have a smaller or a larger working width than the embodiment shown. The machine may, for example, have a working width of 50 cms or one of 3 meters. Because of its compact structure the machine is particularly suitable for attachment to the three-point lift of a tractor, since the lifting device of the tractor will not be exposed to extreme loads.

The manner in which a furrow slice is inverted is shown in detail in FIG. 8, which shows for the sake of clarity consecutive positions of part of a slice. During the displacement of the driven rollers 15, the portion concerned successively attains the positions 1 to 3. As soon as the portion enters the drum it is turned over to a greater or lesser extent, depending on the rotary speed of the drum concerned. The turning movement of the furrow slice is shown schematically in FIG. 8 by successive positions 4, 5 and 6. In position 6 the portion is near the rear end of the drum from which it is deposited. With the row of rollers at an angle of about 20° to the horizontal, as in the embodiment shown, the furrow slices are displaced smoothly, and with the rotary axis a of the drums 31 inclined at an angle of about 30°, the furrow slices passed through them are reliably discharged, without sticking.

The machine described is thus provided with at least two turning devices which work on adjoining strips of ground. The turning devices are in overlap in side view. Even if the turning devices would be almost in overlap only, the advantages of a compact machine can still be achieved. It is advantageous that the machine is provided with at least one cutting member, which cuts at least part of the ground situated between two neighbouring turning devices, without turning it. In the embodiment described, these cutting members are positioned in front of the turning devices.

Also for adapting the working of the machine to different ground conditions, it is advantageous that the rotary speed of the turning devices is adjustable. The soil can be turned reliably if the internal surface of a drum is provided with projections such as the ribs described. It is advantageous if the ribs are not too high, as this may result in too much resistance for the passage of the slices. Preferably the height of the ribs is smaller than the half of the internal radius of the drum. Thus the projections preferably have a relatively small height, but they may extend over the whole length of the drum.

The passage of the furrow slices through the turning device is facilitated by tilting the device so that its axis of rotation slopes downwardly from front to rear.

It further may be advantageous to provide for transport means arranged to act on the upper surface of the slice, so as to displace the upper part of the slice laterally.

It is also advantageous if the length of the drum is not too large in comparison with its width, in order to avoid too much friction between the furrow slice and the walls of the drum and if such drums are supported in the frame of the machine by supporting rollers instead of, for example, a ring bearing. It has been found that the use of rollers provides very reliable support for the devices.

The working width of the plow is more than the distance between two connecting points with which the plow is connectable to the three point hitch of a tractor.

While various features of the machine that have been described, and that are illustrated in the drawings, will be set forth in the following claims as inventive features, it is to be noted that the invention is not necessarily limited to these features and that it encompasses all of the features that have been described both individually and in various combinations.

I claim:

1. A plow for cutting and turning furrow slices comprising a frame having multiple point coupling means for connection to the points of a lifting hitch of a tractor, cutting means adjacent the forward side of said frame for cutting furrow slices, elevating means mounted on said frame to the rear of the cutting means for moving the furrow slices rearwardly and upwardly to at least one furrow slice turning member, said turning member being rotatably mounted on said plow to the rear of said cutting means and positioned to receive the furrow slices from said elevating means, said turning member being rotatable about an axis inclined to the horizontal to guide furrow slices downwardly to the ground at the rear of the machine, a plurality of turning members mounted side-by-side, each said turning member being a hollow drum and said driving means comprising rollers that engage the cylindrical surfaces of said drum to rotate same, variable driving means connected to rotate each said turning member, said drums being mounted in pairs and said driving means including a transverse shaft that is rotated by a hydraulic motor, respective drive shafts for each pair of said drums being engaged by said transverse shaft and each drive shaft mounting a grooved drive roller that engages a corresponding flanged ring around the outer side of each drive of said pair to rotate same, whereby said furrow slices are turned through a pre-selected angle during operation, said slices being deposited to the rear of the plow in the furrows being formed during cutting, said driving means being connectable to the power take-off of the tractor.

2. A plow as claimed in claim 1, wherein said drums have projections on their inner surfaces.

3. A plow as claimed in claim 2, wherein said projections have heights less than one half the radius of the respective drum member.

4. A plow as claimed in claim 1, wherein said drums have diameters that approximate their respective lengths.

5. A plow for cutting and turning furrow slices comprising a frame with coupling points connectable to the three point hitch of a tractor, means adjacent the forward side of said plow for cutting and elevating furrow slices across the working width of the plow, a plurality of hollow turning members rotatably mounted side-by-side to the rear of said cutting means to receive said furrow slices, common driving means connected to rotate said turning members about respective upwardly and forwardly inclined axes of the turning members that extend generally in the direction of plow travel, said driving means being connectable to the power take-off of the tractor, said turning members each having a front opening and a rear exit and said opening being located substantially above said exit, said driving means including roller means that engages the outer surfaces of said turning members, said driving means being variable relative to the travel speed of the plow to control the rotational speed of said turning members, furrow slice conveying means positioned between said tool means and said drum members, said conveying means being positioned to contact the upper surfaces of the furrow slices and displace same sideways relative to the direction of travel, whereby the furrow slices are turned more or less when received in said opening and before being deposited from said exit, the slices being turned through pre-selected angles by said turning members.

6. A plow as clained in claim 5, wherein a transverse beam at the front of said frame mounts the coupling means and a second transverse beam is located to the rear of said first mentioned beam, said coupling means being interconnected to said second beam.

7. A plow as claimed in claim 5, wherein said turning members are drums positioned to work adjoining ground and said cutting means comprises spaced apart rotatable knives that slice furrows between said drums, said driving means being connected to rotate said knives.

8. A plow as claimed in claim 7, wherein said elevating means comprises a roller conveyor that is drivingly connected to said driving means.

* * * * *